United States Patent [19]

Kronawittleithner et al.

[11] Patent Number: 4,683,788
[45] Date of Patent: Aug. 4, 1987

[54] METHOD OF AND APPARATUS FOR CHIP-CUTTING OF WORKPIECES

[75] Inventors: Kurt Kronawittleithner, Bad-Hall; Alfred Pfarrsbacher, Micheldorf, both of Austria

[73] Assignee: Bergsmann Apparatebau Gesellschaft m.b.H. & Co. KG., Micheldorf, Austria

[21] Appl. No.: 820,710

[22] Filed: Jan. 17, 1986

[30] Foreign Application Priority Data

Jan. 28, 1985 [AT] Austria .................................. 213/85

[51] Int. Cl.⁴ .......................... B23B 1/00; B23B 5/14
[52] U.S. Cl. ........................................ 82/47; 82/19; 82/46; 82/53.1; 82/59; 82/70.2; 82/DIG. 9
[58] Field of Search ....................... 82/1 C, 19, 46, 47, 82/53, 53.1, 59, 61, 70.2, DIG. 9

[56] References Cited

U.S. PATENT DOCUMENTS 3,174,404  3/1965  Findley ........................... 82/DIG. 9
4,215,603  8/1980  Jones ..................................... 82/19

FOREIGN PATENT DOCUMENTS 11586    1/1979   Japan ............................. 82/DIG. 9
119301   9/1981   Japan ............................. 82/DIG. 9
324103   2/1972   U.S.S.R. ......................... 82/DIG. 9
429892   10/1974  U.S.S.R. ......................... 82/DIG. 9
912405   3/1982   U.S.S.R. ............................. 82/70.2

Primary Examiner—Nicholas P. Godici
Assistant Examiner—Jerry Kearns
Attorney, Agent, or Firm—Kurt Kelman

[57] ABSTRACT

The invention describes a method and a device for processing by chip-cutting of workpieces. It is preferentially applied for the cross-cutting and chamfering of extruded plastics material tubes. A chip-raising or cutting tool may be fed forward radially with respect to a rotational displacement of the workpiece in the direction of a center of relative rotation. An undulant approach motion is superimposed over the feed motion of the tool. The undulant approach motions of two directly consecutive revolutions are displaced in phase. As a result chip cuttings of uniform and predetermined length are produced with consequent facility in removal and avoidance of interference with the cutting operation.

10 Claims, 6 Drawing Figures

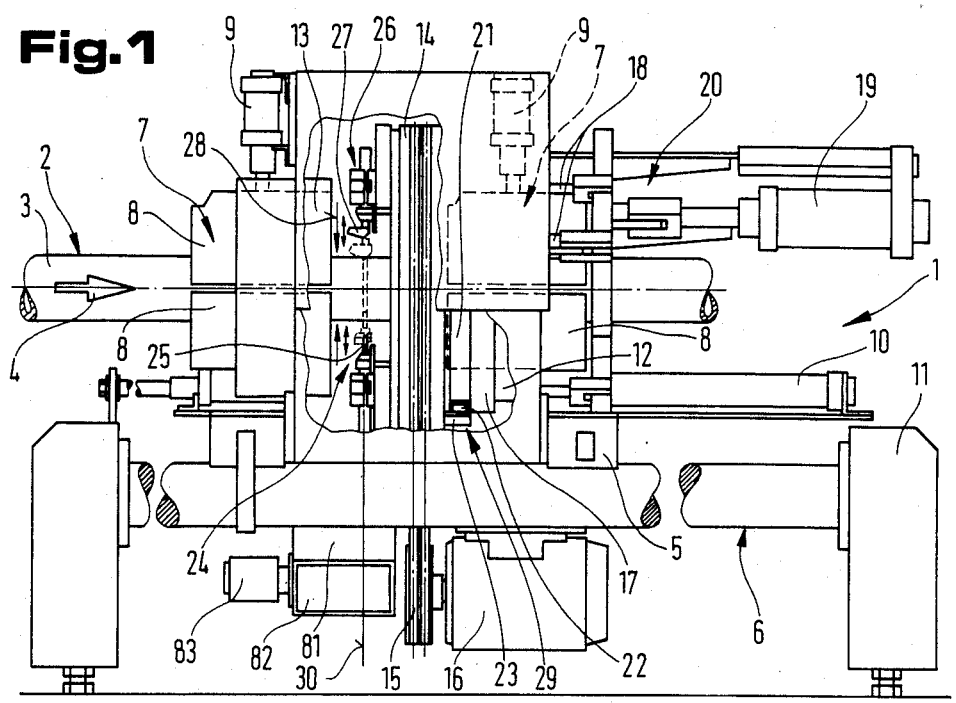
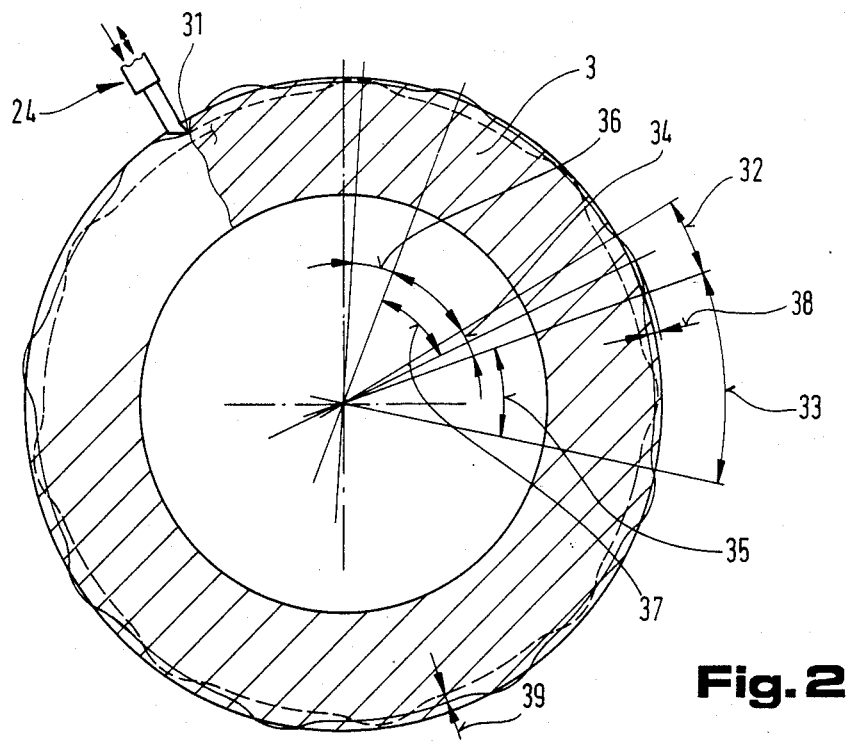

METHOD OF AND APPARATUS FOR CHIP-CUTTING OF WORKPIECES

BACKGROUND OF THE INVENTION

1. Field of the Invention

The invention relates to a method of and a device for chip-cutting of workpieces, in particular for the cross-cutting and chamfering of extruded plastics material tubes or the like and in which a cutting tool may be fed radially to a rotational displacement of the object relative to the tool.

2. Description of the Prior Art

Methods and devices are already known for the cutting and chamfering of round sections—according to EP-Al No. 0103649—which preferably operate with a revolving cutting system for parting off solid or hollow sections such as extruded plastics material tubes or the like. Upon cutting extruded sections, the cutting system is co-entrained in the direction of extrusion, the section which is to be cut or chamfered being held by gripper elements at either side of the plane of rotation of the tools. Two discs are present in this device, which are driven by two rotors at different rotational speeds. The cutting tools are mounted in radially displaceable manner on the one disc and coupled in motion to the second disc via guiding elements, the guiding elements being located in guiding tracks extending eccentrically to a disc centre. A relative displacement of the two discs is caused by the different rotational speed and the tools are displaced in radial direction by the guiding tracks with respect to the disc bearing the same, in the direction towards the workpiece. The relative displacement of the tools may be interrupted by means of a clutch installed in the transmission line to the disc receiving the guiding tracks. It is possible furthermore to construct the guiding tracks in such a manner that the feed motion of the tools occurs in the manner of an intermittent displacement. The embodiment of a device of this kind requires a special structure of the discs carrying the tools and the control curvatures have no more than a fraction of the circumferential length of a single rotational displacement. The intermittent displacements which may be generated if appropriate by corresponding shaping of the guiding track, are consequently inadequate to prevent the appearance of comparatively long cuttings, which may be wound together, or drawn into the hollow section or caught on the workpiece carriers.

It is also known moreover that the feed drives for tool feed may be acted upon in pulsed manner, or rather in the case of piston/cylinder systems, that these may be displaced by brief pressure surges in mutually opposed directions, to secure tearing-off of the cuttings. These control systems require considerable control complexity and very greatly load the mechanism for transmission of the rotational and feed motions, whereby these are exposed to a high degree of wear.

OBJECTS AND SUMMARY OF THE INVENTION

It is an object to provide a method and a device of the kind defined in the foregoing, which allows for producing cuttings of different required lengths in a simple manner under a constant, and in particular, continuous feed displacement of the tools. Beyond this, it should be possible for devices already in service for the processing by cutting of workpieces to be subsequently equipped for implementation of the method according to the invention, in a simple manner.

This problem of the invention is resolved in that the feed displacement of the tool has superimposed on it an undulant and in particular sinusoidal infeed displacement and that the undulant infeed displacements are displaced in phase, through 180° in particular, during two directly consecutive revolutions. The unexpected advantage of this solution consists in the finding that an undulant infeed displacement may be superimposed over the displacement required for tool feed, in order thereby to create a displacement wholly independent of the feed displacement, which at particular predetermined intervals lifts the tool off the cutting area or disengages the tool from the workpiece, thereby causing the cuttings to be torn off. Thanks to the phase displacement of the undulant feed motion during consecutive revolutions, material is removed in those areas in which the tool had been disengaged during the preceding revolution. A uniform removal of material is accomplished throughout the periphery thanks to the areas overlapping each other during consecutive revolutions, in which the tool is in engagement and out of engagement, respectively, in which connection it is assured that cuttings of approximately identical length are produced throughout the processing operation. Another advantage consists in that the application of this superimposed undulant infeed displacement is wholly independent of the rotational speed of the tools or of the magnitude of the feed, during a revolution of the tools relative to the workpiece. A short cutting or chip length may thereby be obtained even at rotational speeds of 300 to 400 revolutions per minute and at correspondingly large diameters of the objects which are to be processed. Short cuttings of this kind may simply be drawn off by suction by means of known suction installations.

It is also possible for the period of oscillation of the two undulant infeed displacements to be smaller than an even fraction of the duration of a tool revolution. It may moreover be accomplished in a simple manner by selection of the period of oscillation of the superimposed undulant infeed displacement that the cutting areas of the consecutive revolutions overlap each other to an equal and opposite extent, so that a uniform removal of material occurs along the periphery of the object to be processed, as an average taken over several rotational displacements.

It is also possible within the ambit of the invention that one amplitude of the undulant infeed displacement may be greater than the magnitude of the feed displacement during a full revolution of the tool. It is accomplished thereby that the tool is disengaged between two areas in which processing of the object occurs by cutting. This interrupts the forming of cuttings and the cutting or chip lengths may be predetermined in a simple manner as a function of the angle of rotation in which the tool is in chip-raising contact with the workpiece. This also facilitates the removal of cuttings and prevents the forming of long cuttings which may be caught on the tools or on the workpiece.

It is advantageous that a workpiece which is to be cut to length may be held fastat either side of a plane of rotation of the tool and that two tools may be provided which are arranged in mirror symmetry with respect to the centre on a diametral line extending through the centre of the rotational displacement, whereof the undulant infeed displacements occur simultaneously and identically. Thanks to the uniformity of the displacements in which the mutually opposed tools are thus moved simultaneously in the direction towards or away from the centre, a constant displacement of the workpiece is obtained despite the superimposed sinusoidal infeed displacements. Deleterious oscillations disturbing the operation of the machine and caused by this superimposed infeed displacement are prevented.

In accordance with the invention, it is also possible that the angle of rotation along which the tool is in chip-cutting engagement with the workpiece may be greater than the angle of rotation of the area in which the tool is not in chip-cutting engagement with the workpiece. It is an advantage that it is thereby possible to operate with a greater rate of advance for the feed displacement, since the sections in which no chip-cutting engagement occurs during the individual revolutions are short as compared to those in which a chip-cutting action had already occurred, and the energy is thus adequate for removal of the material present between the separate sections processed, even at a higher rate of removal of material. The object of the invention, consisting in limiting the cutting or chip lengths to predeterminable sizes, is nevertheless also accomplished.

Provision is made according to another form of the method according to the invention that the tools may be displaceable in radial direction on a rotary tool carrier and are supported on a guiding member displaceable in a direction extending at right angles to the plane of rotation, which has a guiding surface extending obliquely to the plane of rotation, and is guided in a circular circulatory track which is displaced continuously at right angles to the plane of rotation for the purpose of tool feed. The undulant infeed displacement is generated by a distance variation between the circulatory track and the guiding member and is continuous and equal and opposite in consecutive sections. The undulant infeed displacement may thereby be transmitted with little play and does not require any great driving power because of the low weights displaced.

It is also advantageous if the undulant infeed displacement is interrupted immediately before or following cutting through by the tool, and if the tool thereupon makes a full rotational displacement at an unchanged position at a chip-raising position of the tool, since continuously machined surface along the periphery are thereby obtained in the finished product.

The invention also encompasses a device for the chip-raising processing of workpieces, in particular for crosscutting and chamfering of extruded plastics material tubes, comprising clamping devices grasping the workpiece at either side of a plane of rotation, a tool displaceable at right angles to the longitudinal direction of the workpiece for chip-raising processing, which is displaceably mounted in a guiding track arranged parallel to the feed direction and is coupled to a feed drive, as well as a rotational drive for relative rotation between the workpiece and the tool and for application of the method of the invention.

This device is characterised in that the tool has an associated infeed device which is constructed to generate an undulant infeed displacement and situated between a supporting point of the feed drive and the tool. Thanks to the incorporation of the undulating infeed device, an advancing and retreating displacement of the tool continuously superimposed over the feed displacement may be obtained in a simple manner, whereby the tool is periodically disengaged from the workpiece and that cuttings of predeterminable length may thus be produced.

Provision is made according to another embodiment of the invention that the tool is located on a rotary tool carrier coupled to the rotational drive in a sliding guide aligned in radial direction, whereby play-free mounting and precise guiding of the tools are accomplished.

Provision is made according to a further embodiment that the tool is adjustably installed in a tool holder, which is displaceably mounted in the radially extending sliding guide of the rotary tool carrier, and supported under interpositioning of a spring system on a guiding surface of a guiding member displaceably mounted in a guide extending parallel to the longitudinal axis of the object and in a terminal portion oppositely situated to the guiding surface comprises a guiding device located in a circular circulatory track situated in a setting ring which is displaceable in the longitudinal direction of the workpiece with respect to a tubular support member. The support member carries the rotary tool carrier via a bearing system and the infeed device comprises a guiding roller located without play in the circulatory track and eccentrically mounted or constructed, a member utilised for the feed displacement being suitably constructed as a feed mechanism. The method according to the invention is thereby applicable with an extremely low amount of additional expenditure on components.

It is advantageous if a peripheral length of the guiding roller is smaller than an even fraction of a peripheral length of a guiding surface of the circulatory track allocated to the guiding roller, since it is possible thereby in a simple manner to obtain an overlap of the areas machined by means of the tool during consecutive revolutions, without needing mechanical displacing mechanisms or control systems.

It is possible for the guiding roller to have a frusto-conical rolling surface which is aligned parallel to the guiding surface of the circulatory track, thereby preventing slip between the eccentrically mounted roller forming the infeed device, and the guiding surface of the guiding track.

Provision is made according to another form of the invention that the guiding roller is mounted in a roller carriage wherein is situated at least one support roller which is guided on a guiding surface oppositely situated to the guiding surface of the guiding roller. A spring may be placed between the support roller and the guiding roller which exerts a force directed in the direction of the guiding surface of the support roller and of the guiding roller, thereby obtaining play-free guiding of the eccentrically mounted roller on the associated guiding track, irrespective of the direction in which the tool is displaced by the eccentrically mounted roller and irrespective of the centrifugal forces occurring in the region of the tool.

It is advantageous if the circulatory track is formed as a U-shaped groove situated in the setting ring, the support roller bearing on the one and the guiding roller bearing o the other of the mutually opposed guiding surfaces of the U-shaped groove, and the spring is arranged between the guiding roller, mounted in the roller carriage via a spindle extending parallel to the parting plane, and the support roller, pivotable around a pivot pin transversely to the longitudinal extension of the groove, and the support members receive clamping devices, situated at either side of the parting plane for the object, are installed in a carriage which is displaceably guided along a guiding track aligned in the longitudinal direction of the object and is coupled to a reset drive. It is possible thereby to utilise the inventive device even in conjunction with continuously operating extruders since the feed device and the infeed or approach device may be entrained with the moving extruded section.

The guiding roller may be situated between two support rollers arranged one behind another in the peripheral direction of the circulatory track, whereby it is possible to assure play-free running of the eccentrically mounted roller.

Advantageously the guiding roller has a circular cross-section, since this causes identical accelerative and decelerative forces to occur between the approach device and the tool and impacts or percussive stresses on the device or on the associated drives are prevented in this manner.

The guiding surface of the roller carriage may slope at a smaller angle than 45° with respect to the longitudinal axis of the workpiece, since the magnitude of the approach motion occurring at right angles to the direction of displacement is thereby placed in a favourable ratio to the magnitude of the feed displacement.

In a further embodiment the guiding surface has a guiding surface portion extending parallel to the longitudinal axis of the workpiece in the area situated next to the terminal position of the tool, since an even cutting pattern is obtained on the cutting or processing surface without particular control operations or complementary devices.

The guiding surface allotted to the guiding roller may have allocated to it another guiding surface portion displaceable independently of the former in the longitudinal direction of the workpiece, which is coupled to a displacing drive, the guiding surface of the guiding roller and the guiding surface portion being associated with another support roller and the distance between one side of the support roller associated with the guiding surface portion and the support roller associated with the oppositely situated guiding surface preferably being greater than the minimum spacing between the axes of rotation of the support roller and the guiding roller plus half a diameter of the guiding roller and the large radius of the guiding roller. The superimposed approach motion may thereby be turned on and off at any time by a corresponding displacement of the guiding surface portions.

A revolving cam may be situated between the feed drive of the feed device and the tool, which is coupled to a rotational drive, the rotational drive preferably simultaneously driving the workpiece and the cam via a distributor gear, whereby the approach motion may be transmitted onward to the tool irrespective of the feed motion, and an appropriate coupling or phase shift of the undulantly occurring approach motion being obtainable, for example via the drive of the workpiece.

BRIEF DESCRIPTION OF THE DRAWINGS

The invention will now be described, by way of example, with reference to the accompanying, partly diagrammatic drawings, in which:-

FIG. 1 is a simplified partly fragmented elevation of a device for chip-cutting of workpieces, FIG. 2 is a partly sectional end view of a workpiece to be processed, in which is depicted the path of displacement of the cutting edge of a processing tool, the illustration corresponding to a section taken along the lines II—II but throughout the cross-section of the workpiece according to FIG. 3.

DETAILED DESCRIPTION OF PREFERRED EMBODIMENTS

Figure 3:
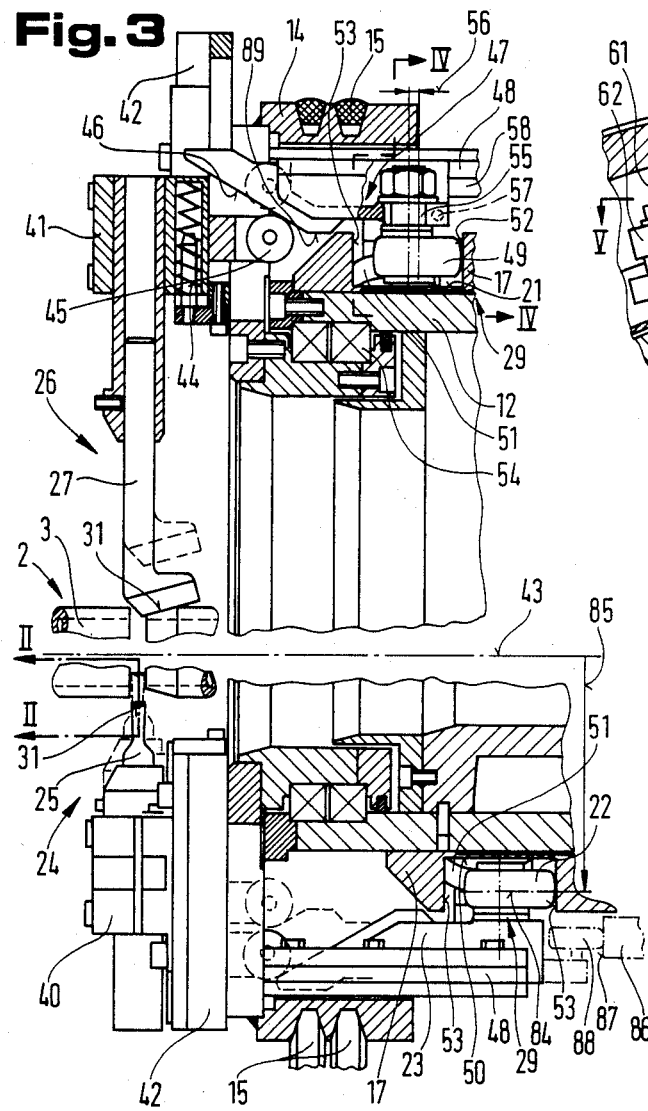
FIG. 3 is a partly sectional side elevation of the device of FIG. 1 showing the mounting of the tools as well as the structure of the approach device in the device according to FIG. 1, in sideview and in cross-section.

FIG. 1 illustrates a device 1 for chip-removing processing of objects 2, e.g. an extruded plastics material tube 3. The plastics material tube 3 is moved forward continuously whilst coming from the extruder in the direction of extrusion—arrow 4—and is cut to the required lengths during this continuous forward displacement. To this end, the device 1 has a carriage 5 which is displaceable in and opposite to the direction of extrusion—arrow 4—along a guiding track 6 formed by guiding posts. To this end, the carriage 5 has clamping devices 7 whereof the clamping jaws 8 may be placed in contact with the plastics material tube 3 via clamping drives 9, e.g. hydraulically or pneumatically operated piston/cylinders systems, whereby the carriage 5 is coupled in motion to the plastics material tube 3 and is displaced by the plastics material tube 3 along the guiding track 6 in the direction of extrusion—arrow 4. To reset the carriage 5 against the direction of extrusion, a reset drive 10 is provided, for example a piston/cylinder system which may be acted upon by pressure fluid, by means of which the carriage 5 may be returned to its original position situated in the left-hand terminal portion of the guiding track 6 in the drawing. The length of the guiding track 6, whose the guiding posts are mounted in a machine table 11, is determined as a function of the processing period of the plastics material tube 3 by means of the device 1 and as a function of the feed of the carriage 5 or of the plastics material tube 3 in the direction of extrusion—arrow 4. The structure of such devices 1 entrained with the objects 2 which are to be processed under application of a carriage 5 and of a guiding track 6 is known and the construction of the parts of the device may be performed in accordance with the different proposals disclosed in the prior art.

The carriage 5 furthermore bears tubular support members 12,13 on which are fastened the clamping devices 7 or rather their clamping jaws 8 and the clamping drives 9. A tool carrier 14 is rotatably installed on the support member 12, apart from the clamping device 7. The tool carrier 14 is placed in rotation via Vee-belts 15 by a rotational drive 16. A setting ring 17 is displaceably arranged in the direction of extrusion—arrow 4—on the support member 12, between the tubular support member 12 and the annular seat of the tool carrier 14 wherein are situated the Vee-belt grooves for the Vee-belts 15, and is coupled in motion to a feed drive 19 of a feed device 20 via displacing arms 18. In the setting ring 17 is provided a circular track 21 wherein a guiding roller 22 of a roller carriage 23 cooperates with a tool 24, e.g. a cutting blade 25, to displace this cutting blade 25 from the idle position shown in solid lines into the position of engagement shown by pecked lines. A tool 26 comprising a chamfering cutter 27 is actuated by an analogous guiding roller and a corresponding guiding carriage. Whilst the plastics material tube 3 is being extruded continuously, a plastics material tube of the length required is cut off by means of the cutting blade 25 and the facing tube ends at either side of the cutting point are chamfered simultaneously. The continuous displacement of the tools 24 and 26 in the direction towards the plastics material tube 3 is indicated by an arrow 28. The double-headed arrows symbolically show that an undulant or rather oscillatory and in particular sinusoidally extending motion of a tool displacement device 29 is superimposed on this feed motion of the feed device 20.

In FIG. 2 is illustrated a cross-section through a plastics material tube 3 in the region of a cutting plane 30, FIG. 1, the displacement of a cutting edge 31 of the tool 24 with respect to the plastics material tube 3 being illustrated by solid lines for one revolution and by pecked lines for another revolution. As apparent from this illustration of the cutting line of the tool 24, a sector 32 along which the cutting edge 31 of the tool 24 is not in cutting engagement with the plastics material tube 3 is always smaller than a sector 33 along which a cutting engagement and thus a removal of material occurs. The resultant displacement of the cutting edge 31 substantially corresponds to an oscillatory trace in which the time integral of the oscillatory period during which the cutting edge 31 is in cutting engagement with the plastics material tube 3 amounts to a multiple of the time integral of the oscillatory period during which the cutting edge 31 is disengaged from the plastics material tube 3. This also emerges from the fact that an angle of rotation 34 through which the tool 24,26 is not in cutting engagement is smaller than an angle of rotation 35 during which a chip-removing machining operation occurs on the object 2.

The chip length may be controlled and altered in a simple manner by selection of the magnitude of the time interval of the two different operational stages, that is of the extents of the sectors 32,33 and of the angles of rotation 34,35.

As further apparent from the illustration in FIG. 2, the undulant approach displacement or rather the oscillatory displacement of the cutting edge 31 occurs under phase displacement during the processing operation, in directly consecutive revolutions. A phase displacement 36 indicated by a phase displacement angle is not an even fraction of a period of oscillation 37, so that as easily apparent from the illustration, an identical and opposed overlap of the sectors 32 and 33 is the result during two directly consecutive revolutions of the tool 24. This has the result that a substantially uniform removal of material occurs throughout the peripheral length and that the chip or cutting length may nevertheless be kept substantially identical. The sectors 32 in which the tool 24 is not in chip-raising engagement with the plastics material tube 3 are consequently situated in the sectors 33 of the preceding tool revolution, in which the cutting edge 31 had been in chip-removing engagement with the plastics material tube 3.

It is evidently also possible for the phase displacement 36 to amount to a quarter or a third or other even fraction of the period of oscillation 37.

As more clearly apparent from the illustration moreover, an amplitude 38 of the undulant infeed or approach motion and of the oscillatory displacement of the cutting edge 31 of the tool 24 is larger than a displacement 39 of a feed motion during a full revolution of the tool 24. It is thereby assured in a simple manner that an interruption of the processing displacement or rather of the cutter operation may be obtained continuously around the periphery of the plastics material tube 3 by means of the undulant infeed motion, and that the chip length may be maintained precisely.

The tools 24 and 26 are illustrated on an enlarged scale in FIG. 3. The cutting blade 25 as well as the chamfering cutter 27 are exchangeably clamped in tool holders 40,41. The structure and operation of the two tool holders 40,41 is identical, wherefore the fastening, mounting and displacement are described only in connection with the tool holder 41. The tool holder 41 is displaceably mounted in radial direction on the tool carrier 14 in a sliding guide 42 which is radially aligned with respect to a longitudinal axis 43 of the object 2 comprising the plastics material tube 3 which is to be processed. A roller 45 of the tool holder 41 is thrust without play against a guiding surface 46 of a roller carriage 47, via a spring system 44. This roller carriage 47 is displaceably mounted in a guide 48 extending parallel to the longitudinal axis 43. The displacement of the roller carriage 47 and its positioning in its setting with respect to the roller 45 of the tool holder 41 occurs by means of a guiding roller 49 which is guided in circular track 21 of the setting ring 17. The setting ring 17 is displaceable on a support member 12 in the longitudinal direction of the longitudinal axis 43. The roller carriage 23 facing the tool 24 and the setting ring 17 associated therewith are shown in their position prior to starting a processing operation, whereas the roller carriage 47 is shown in the position it has whilst the plastics material tube 3 is being processed by means of the tool 26. Whereas the setting ring 17, together with the circular track 21 formed by a U-shaped groove 50, is then at rest, the guiding rollers 49 as well as support rollers 51 situated opposite thereto roll along mutually opposed guiding surfaces 52 and 53. The guiding rollers 22 and 49 as well as the support rollers 51 associated with them, are jointly placed in rotation with the roller carriages 23 and 47 via the tool holder 14 engaging the Vee-belts 15, the tool carrier 14 being mounted in freely rotatable manner on the support member 12 via a bearing system 54. The roller carriages 23 and 47 are mounted or secured in the disc-like tool carrier 14 in guides 48 situated in cut-outs in the tool carrier, and the tool holders 40 and 41 are mounted or secured in the sliding guides 42.

Thanks to the displacement of the setting ring 17 by means of the feed drive 19—FIG. 1—the roller 45 of the tool 26 is displaced from the position shown by pecked lines by the action of the guiding surface 46 extending obliquely to the longitudinal axis 43 into the position illustrated by solid lines, thereby displacing the tool 26 from the pecked position in which it is out of chip-removing contact with the plastics material tube, into the operating position for chip-cutting processing of the plastics material tube 3.

An undulant approach motion is superimposed over this feed motion by means of the setting ring 17 thanks to an eccentric mounting of the guiding roller 49 on a spindle 55 of the roller carriage 47, the period of oscillation of this undulant approach motion corresponding to the peripheral length of the guiding rollers 22 and 49 respectively. The amplitude of the undulant approach motion of the tool displacement device 29 is determined by an eccentricity 56 between the centre line of the spindle 55 and the centre lines of the guiding rollers 22 and 49, respectively. It is also possible however to replace a circular periphery of the guiding rollers 22,49 by a cam-shaped periphery having a constant diameter along a part thereof while the diameter is reduced along the residual part of the periphery by the amount of the amplitude, a transition between these peripheral parts occurring as continuously as possible. Thanks to the spring system 44, as well as to respective springs 57 acting between the support rollers 51 and the associated guiding rollers 22 or 49, it is possible despite the accelerations of the tools 24,26 constantly directed in opposed directions, to secure play-free guiding of the guiding rollers 22 and 49 along the guiding surface 52 and to assure a smooth guiding of the cutting edges 31 of the tool 24 and 26.

Figure 4:
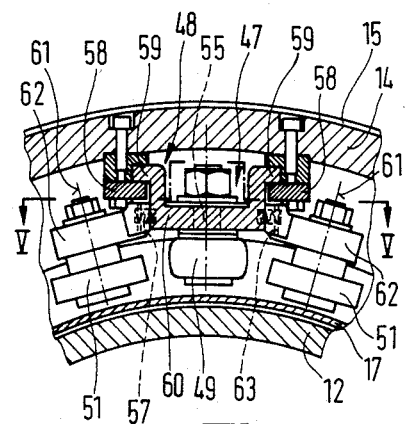
FIG. 4 is a partly sectional view along the lines IV—IV in FIG. 3 showing the arrangement of guiding and support rollers in a roller carriage of the device of FIGS. 1–3.
Figure 5:
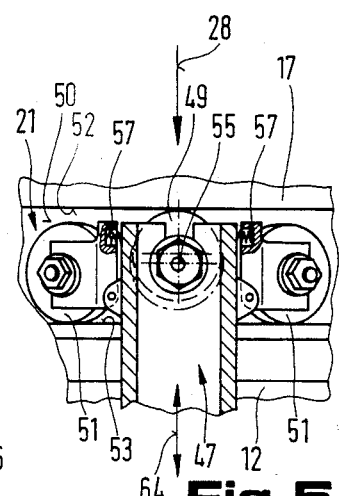
FIG. 5 is a partly sectional plan view of the roller carriage, taken along the lines V—V in FIG. 4.

The structure of the guide 48 of the roller carriage 47 as well as the arrangement of the guiding roller 49 or of the support rollers 51 allocated thereto, are more clearly apparent from FIGS. 4 and 5. To this end, guiding rails 58 of the guide 48 in which are guided guiding bars 59 of the roller carriage 47, are mounted on the disc-like tool holder section of the tool carrier 14 which has the grooves for the Vee-belts 15. A bearer element 60 of the roller carrier 47 bears the spindle 55 of the guiding roller 49. The support rollers 51 are rotatably journalled on spindles 61. Holders 62 for the spindles 61 are displaceable around pivot pins 63 in the longitudinal direction of the longitudinal axis 43 by the action of the spring 57 situated between the bearer element 60 and each holder 62.

As more clearly apparent from FIG. 5, the action of the spring 57 causes the guiding roller 49 as well as the support rollers 51 to bear without play on the facing guiding surfaces 52,53, respectively of the stationary circular track 21 formed by U-shaped groove 50. Whereas the feed motion is thus established by a displacement of this U-shaped groove via the setting ring 17 receiving the same with respect to the support member 12—as indicated symbolically by the arrow 28—the undulatory approach motion is caused by a relative displacement of the roller carriage 47 with respect to the guiding surface 52 facing its guiding roller 49—as shown by a double-headed arrow 64. The action of the feed drive 19—FIG. 1—is not deleteriously affected thereby. As apparent from the drawing, the guiding roller 49 is eccentrically mounted on the spindle 55 in the present embodiment. It would also be possible to mount the guiding roller 49 centrally on the spindle 55 and to form the same eccentrically over a part circumferential section, as denoted by dash and dash-dotted lines. This has the result that the processing by cutting of the object 2 occurs at a constant depth of penetration or thickness of material removal, whereas a relative displacement between the guiding surface 52 and the roller carriage 47 respectively occurs only across the eccentric section in which the tool 24 or 26 is disengaged from the object 2. No sinusoidal approach motion is accomplished in this case, but an approximately trapezoidal stepped path.

Figure 6:
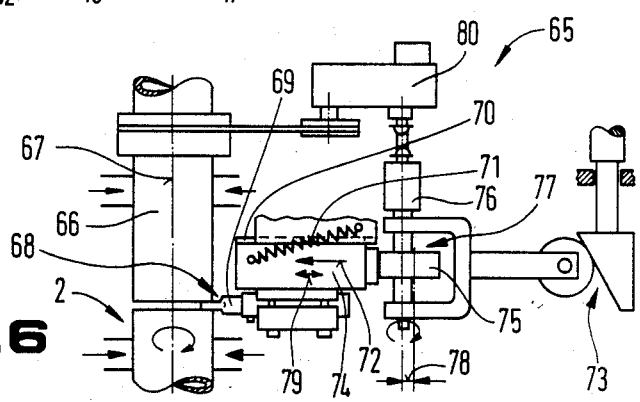
FIG. 6 is a simplified plan view of a modified embodiment.

A modified embodiment of an inventive device 65 is shown in FIG. 6, in which an object which is to be processed or cut to lengths, for example a plastics material section 66, revolves about its longitudinal axis 67. A tool 68, e.g. a cutting blade 69, is movable in a longitudinal guide 70 aligned at right angles to the longitudinal axis 67, in the direction towards the object 66 against the action of a spring system 71. The feed motion is indicated by an arrow 72 and is performed by a feed device 73. This feed device 73 has a wedge-like surface in the present embodiment which is displaced parallel to the longitudinal axis 67 of the object 66 and which displaces a tool holder 74 bearing the tool 68 along the longitudinal guide 70 in the direction towards the object 66, via a roller and a support bracket.

Through the action of spring system 71, the periphery of the tool holder 74 bears on eccentrically mounted revolving cam 75 arranged between the roller of the feed device 73 and the tool holder 74. The cam 75 is placed in rotation via a drive spindle 76, the cam and spindle forming approach device 77—as shown by an arrow. The eccentricity 78 of cam 75 corresponds to the amplitude of an undulant approach motion, which is denoted by an arrow 79 in the region of the tool holder 74. The drive spindle 76 is driven via a rotational drive 80, which simultaneously places the object 66 in rotation through a universal joint shaft arranged to accommodate the feed displacement by the feed device 73.

The drive for the object 66 and the cam 75, under appropriate selection of the peripheral length of the cam 75, is so synchronized that the sections in which the tool 68 is in cutting engagement with the object 66 overlap the sections in which it is not in cutting engagement, during directly consecutive revolutions. As already described in particular in connection with the embodiment depicted in FIGS. 1 to 5, an approximately identical chip length is obtained during the processing operation, irrespective of the thickness of the object 2 to be severed.

It is evidently also possible in this embodiment to place the driving spindle 76 and the object 66 in rotation via separate rotational drives, in which connection it would then be appropriate however to synchronise their motions in a different manner, for example by means of an electronic control system or the like, to accomplish that—during consecutive revolutions of the object—the sections are always processed which had not been processed during the preceding revolution.

The cuttings produced by devices of this nature may for example be collected in a chute 81 as shown diagrammatically in the device according to FIG. 1, and discharged via a conveying passage 82 by a blower 83 into a central bin, for example as known in the case of other chip cutting processing machines, for example planing machines, wood-milling machines or the like.

It is evidently possible within the scope of the invention to generate the superimposed approach motion by other means, for example by means of oscillation generators situated in the path of transmission between the feed device and the tool and driven hydraulically, pneumatically or mechanically, to which end care should merely be applied to ensure that in accordance with the inventive method, the amplitude of these oscillations should at least correspond to the magnitude of the feed path during one revolution of the tool, but is preferentially larger, and that the sections in which the tools are in cutting engagement and out of cutting engagement overlap each other during two directly consecutive revolutions.

The peripheral length in the region of a contact plane 84—FIG. 3—is utilised to determine the peripheral length of the guiding surface 52 and of the guiding roller 49. In the cross-sectional area of the guiding roller 49 situated in the contact plane 84, the periphery of the same and simultaneously also the periphery of the contact line between the guiding roller 22,49 and the guiding surface 52 are determined by reference to a radius 85 of the contact plane 84 from a longitudinal axis 43.

As further indicated diagrammatically in FIG. 3 by dash-dotted lines, it is possible to provide another setting ring 86 comprising a guiding surface section 87 which cooperates with another support roller 88 rigidly installed on the roller carriage 23,47. To this end, the setting ring 86 is advanced so far in the direction of the roller carriage 23,47, until the same is guided solely by the mutually opposed support rollers 88 and 51 and the guiding roller 22,49, is thus disengaged from the guiding surface 52. This renders it possible during the final section of the cutting operation to turn off the undulant approach motion at any optional position of the roller 45 with respect to the guiding surface 46 by means of a feed displacement of the setting ring 86, and thereby to produce a completely smooth cutting surface or processing surface. If this setting ring 86 is installed on the setting ring 17 and is displaceable with respect to the same, it is also possible even in this position to undertake a corresponding feed of a magnitude which for example corresponds to the amplitude of the approach motion, so that possible rough spots in the surface processed are eliminated reliably.

On the other hand, it is also possible to provide the guiding surface 46 with a guiding surface portion 89 extending parallel to the longitudinal axis 43. This has the result that, at the end of the feed motion, the action of the tool displacement device 29 is turned off under simultaneously unchanged feed. It is accomplished thereby that protuberances left over from the preceding revolution, at which the tools 24,26, were out of cutting engagement, are cut down.

It is to be understood that the. magnitude of the amplitude, of the undulant approach motions, as well as the amount of the feed motion and of the oscillation period, have been illustrated to an exaggerated scale, to facilitate understanding of the inventive method and inventive device. It should be considered in this connection that the rotational speeds for such objects or tools may amount to between 300 and 400 r.p.m. and that accordingly, the feed may be of a magnitude of 1 mm and less per revolution. For example, the peripheral length of the contact line in the contact plane 84 may be 19.5 times greater than the peripheral length of the guiding rollers 22 and 49.

Whilst the invention and many of its attendant advantages will be understood from the foregoing description, it will be apparent that various changes may be made in the form, construction and arrangement of parts and in the method steps without departing from the spirit and scope of the invention or sacrificing all of its material advantages, the form hereinbefore described merely being preferred embodiments thereof.

We claim:

1. An apparatus for processing a workpiece having a longitudinal axis by chip-cutting, which comprises
   (a) a clamping device arranged to grasp the workpiece at respective sides of a plane of rotation containing the longitudinal axis of the workpiece,
   (b) a chip-cutting tool for processing the workpiece,
   (c) a rotatable tool carrier having a sliding guide extending in a radial direction with respect to the longitudinal axis of the workpiece and slidably supporting the chip-cutting tool,
   (d) a guiding track arranged parallel to the longitudinal axis of the workpiece and displaceably mounting the tool carrier,
   (e) a feed drive coupled to the tool carrier for displacing the tool carrier along the guiding track,
   (f) a rotational drive coupled to the tool carrier for rotating the tool about the longitudinal axis of the workpiece, and
   (e) means for displacing the chip-cutting tool radially along the sliding guide and arranged to generate an undulant displacement motion, the undulant displacement motion means including
      (1) an eccentric guiding roller coupled to the rotatable tool carrier, and
      (2) a non-rotatable circular track extending concentrically about the longitudinal axis of the workpiece and having a guiding surface engaging the guiding roller during rotation of the tool,
      (3) the guiding roller having a peripheral length smaller than an even fraction of the peripheral length of the guiding surface.

2. The apparatus of claim 1, further comprising a support member extending parallel to the longitudinal axis of the workpiece and bearing the rotatable tool carrier, a setting ring displaceably arranged on the support member and defining the circular guide track, a guide in the tool carrier extending parallel to the longitudinal axis of the workpiece, a roller carriage carrying the guiding roller and displaceable in the guide during rotation of the tool and engagement of the guiding roller with the guiding surface, the guiding member having a guiding surface concentrically surrounding the longitudinal axis, a tool holder radially displaceably mounted in the sliding guide of the rotatable tool carrier, the tool holder carrying a roller, and spring means biasing the tool holder roller against the guiding surface of the roller carriage.

3. The apparatus of claim 2, wherein the guiding surface of the roller carriage has at least a portion inclined with respect to the longitudinal axis of the workpiece by an angle smaller than 45°.

4. The apparatus of claim 2, wherein the guiding surface of the roller carriage has a portion extending parallel to the axis of the workpiece immediately adjacent a radial end position of the chip-cutting tool.

5. The apparatus of claim 1, wherein the fixed circular track is defined by a U-shaped groove, one side of the groove defining the guiding surface engaged by the guiding roller and an opposite side of the groove defining another guiding surface, and further comprising a support roller engaging the opposite guiding surface, the guiding roller having an axis extending perpendicularly to the longitudinal axis of the workpiece and the support roller being pivotal about an axis for pivoting transversely to the longitudinal extension of the groove, and a spring arranged between the axes of the guiding roller and support roller.

6. The apparatus of claim 5, comprising two of said support rollers arranged sequentially in the peripheral direction of the circular track, the guiding roller being arranged between the two support rollers.

7. The apparatus of claim 5, further comprising another guiding surface associated with the guiding surface engaged by the guiding roller, the other guiding roller being independently displaceable in the direction of the longitudinal axis of the workpiece, a further support roller engageable by the further guiding surface.

8. The apparatus of claim 7, wherein the spacing between the sides of the support roller engaging the opposite guiding surface and of the further support roller engageable by the further guiding surface is greater than the minimum spacing between the axes of the support roller and of the guiding roller plus the radius of the support roller and the largest radius of the guiding roller.

9. A method for processing a workpiece having a longitudinal axis by chip-cutting, which comprises
  (a) grasping the workpiece at respective sides of a plane of rotation containing the longitudinal axis of the workpiece,
  (b) processing the workpiece with a chip-cutting tool by rotating the tool about the longitudinal axis and radially displacing the tool towards the longitudinal axis in an undulant displacement motion, and
  (c) displacing the undulant displacement motion between consecutive revolutions of the tool with an eccentric guiding roller rotatable with the tool and engaging a guiding surface of a non-rotatable circular track extending concentrically about the longitudinal axis of the workpiece, the guiding roller having a peripheral length smaller than an even fraction of the peripheral length of the guiding surface.

10. The method of claim 9, wherein the workpiece is chip-cut by two of said tools arranged at respective sides of the plane of rotation in mirror symmetry with respect to the longitudinal axis, the tools being rotated and radially displaced in undulant displacement motions simultaneously and uniformly, the undulant displacement motions are interrupted immediately before and after the tools have cut through the workpiece, and the tools are rotated for at least one further revolution in chip-cutting position without the undulant displacement motions.

* * * * *